J. WHIKEHART & R. M. SMITH.
HEATER.
APPLICATION FILED JAN. 9, 1915.
1,171,372.
Patented Feb. 8, 1916.
2 SHEETS—SHEET 1.
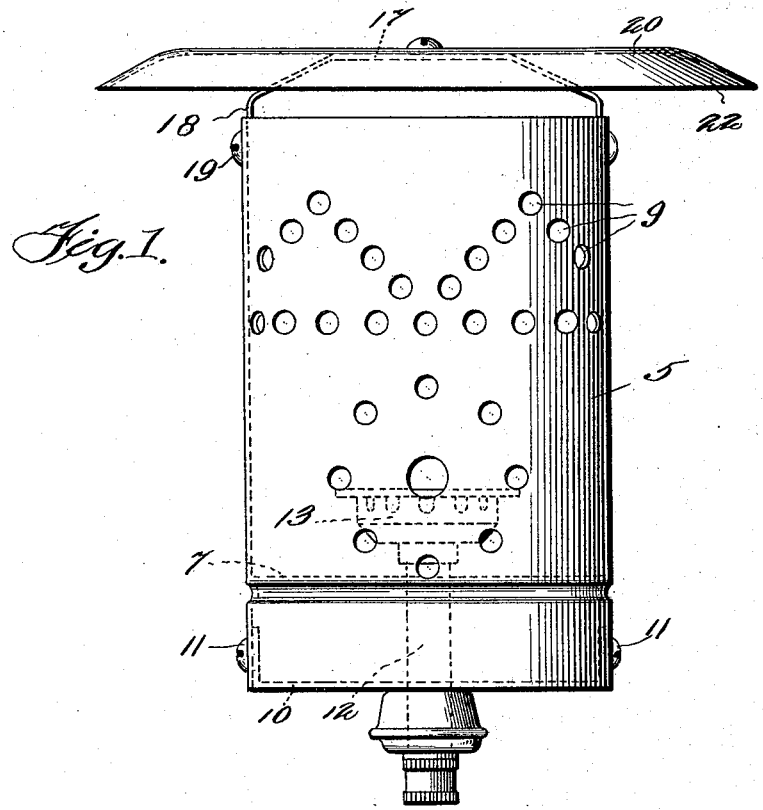
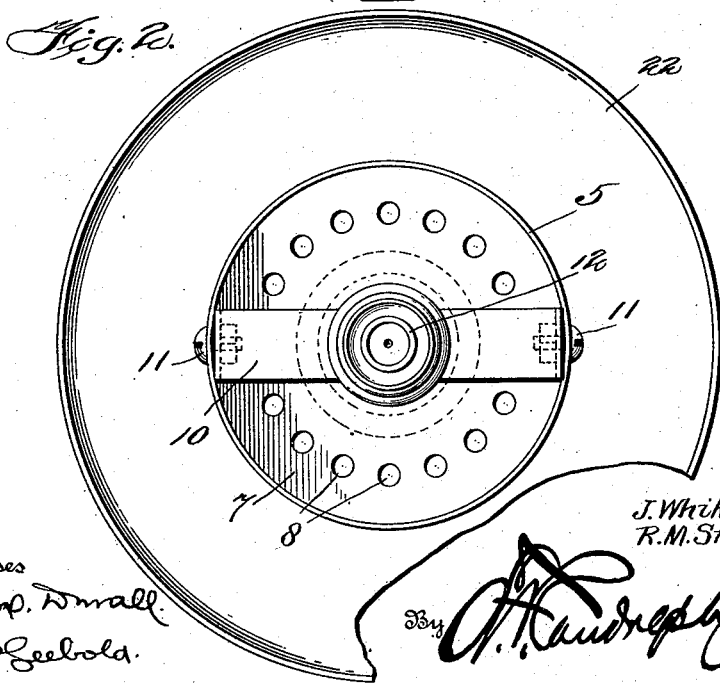
Witnesses
Inventors
J. Whikehart
R. M. Smith,
By
Attorney
THE COLUMBIA PLANOGRAPH CO., WASHINGTON, D. C.

J. WHIKEHART & R. M. SMITH.
HEATER.
APPLICATION FILED JAN. 9, 1915.
1,171,372.
Patented Feb. 8, 1916.
2 SHEETS—SHEET 2.
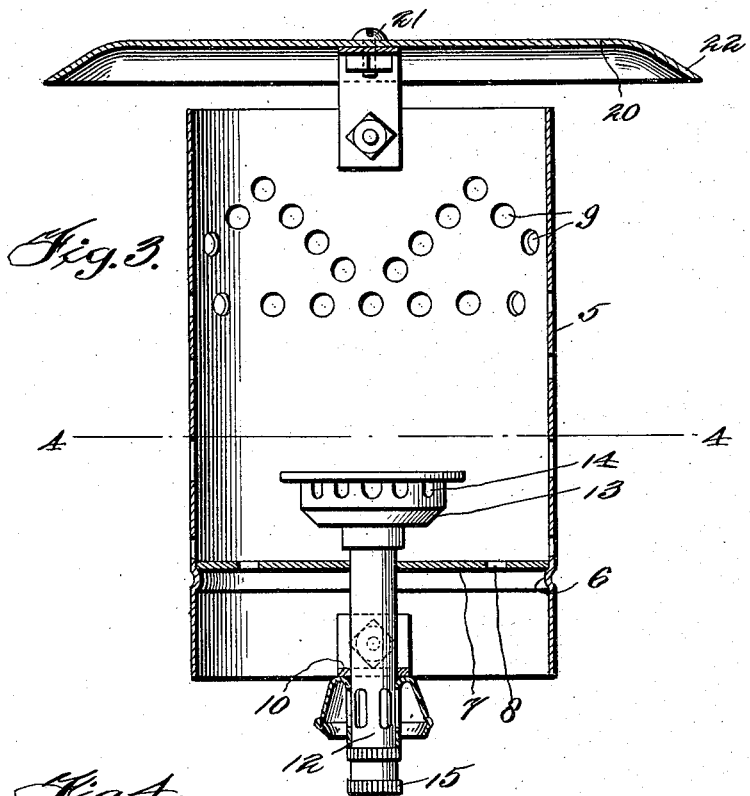
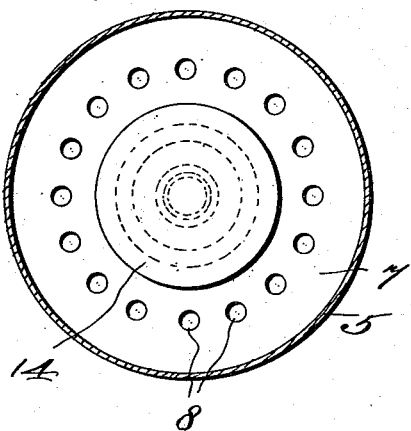
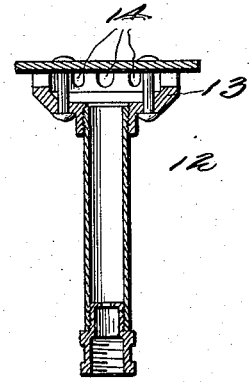
Inventors.
J. Whikehart
R. M. Smith,
Witnesses

UNITED STATES PATENT OFFICE.

JOHN WHIKEHART AND ROE M. SMITH, OF ZANESVILLE, OHIO.

HEATER.

1,171,372.  Specification of Letters Patent.  Patented Feb. 8, 1916.

Application filed January 9, 1915.  Serial No. 1,385.

*To all whom it may concern:*

Be it known that we, JOHN WHIKEHART and ROE M. SMITH, citizens of the United States, residing at Zanesville, in the county of Muskingum and State of Ohio, have invented certain new and useful Improvements in Heaters; and we do hereby declare the following to be a full, clear, and exact description of the invention, such as will enable others skilled in the art to which it appertains to make and use the same.

This invention has for its object to provide an efficient and inexpensive gas heater especially designed for attachment to gas pipes of illuminating burners.

Another object is the provision of a gas heater including a cylindrical body or drum in which the gas burner is arranged and provided with a pivoted deflector plate at its upper open end whereby the heat may be deflected laterally in either direction so as not to come in contact with a wall or other inflammable object when the heater is placed adjacent thereto.

With these and other objects in view, the invention consists in the novel construction, arrangement and formation of parts as will be hereinafter specifically described, claimed and illustrated in the accompanying drawings, in which:

Figure 1 represents a side elevation of the heater complete. Fig. 2 represents a bottom plan view of the heater. Fig. 3 represents a longitudinal sectional view therethrough. Fig. 4 represents a transverse sectional view on the line 4—4 of Fig. 3, and Fig. 5 represents a longitudinal sectional view through the burner removed.

Referring to the drawing in detail, wherein similar reference numerals designate corresponding parts throughout the several views, the numeral 5 indicates the hollow cylindrical body or drum of the heater having an annular internal enlargement or rib 6 adjacent its lower extremity supporting a circular plate 7 in position therein. The plate 7 is formed with a plurality of perforations 8 to insure a proper draft through the drum 5 which latter is formed with a plurality of openings 9 to permit of the escape of the heated air.

A strap 10 is disposed diametrically across the lower open end of the drum 5 and is provided with angularly directed ends secured in position by bolts or equivalent means 11. The strap 10 and draft plate 7 are formed with central openings in which is secured the body or tube 12 of a preferred type of gas burner extending a distance above the plate 7 and having a distributer plate 13 formed with a plurality of radially extending openings 14 secured to its upper end. A coupling sleeve 15 is secured to the lower extremity of the burner tube 12 and is formed with internal screwthreads whereby the heater may be secured in position upon the threaded extremity of a gas pipe.

A supporting member 17 is formed with angularly directed ends 18 pivotally secured diametrically within the upper open end of the drum 5 by bolts 19 or equivalent means. A deflector plate 20 preferably of circular formation is secured centrally of the member 18 by a bolt 21 and is formed with a downwardly directed marginal portion 22, whereby the heated air rising within the drum 5 will be deflected downwardly.

In use, the heater is secured in position upon a gas pipe (not shown) by means of the coupling sleeve 15 and the flame issuing from the apertures 14 in the member 13 thoroughly heats the drum 5. The heated air rising within the drum strikes the deflector plate 20 and is deflected downwardly by the downwardly directed marginal portion 22 thereof. When the heater is placed in a position adjacent a wall or other inflammable object the deflector 20 may be tilted so as to direct the heated air rising within the drum 5 away from the object and thus eliminate danger of fire.

What we claim is:

A heater comprising a cylindrical drum having a plurality of perforations, a plate having a plurality of perforations secured adjacent the lower extremity of said drum, a burner secured to the lower portion of said drum projecting upwardly through said plate, a supporting member having angularly directed ends pivotally secured at diametrically opposite points adjacent the upper extremity of said drum, and a circular plate of greater diameter than said drum and having a downwardly directed marginal portion secured centrally to the central portion of said supporting means.

In testimony whereof we affix our signatures in presence of two witnesses.

JOHN WHIKEHART.
ROE M. SMITH.

Witnesses:
E. E. POWER,
JOHN H. WHARTENBY.

Copies of this patent may be obtained for five cents each, by addressing the "Commissioner of Patents, Washington, D. C."